US012044246B2

(12) United States Patent
Liu et al.

(10) Patent No.: US 12,044,246 B2
(45) Date of Patent: Jul. 23, 2024

(54) DEVICE, OPTIMIZATION METHOD AND SYSTEM FOR COOPERATIVE MATCHING OF HEAT DISSIPATION AND NOISE

(71) Applicant: JIANGSU XCMG CONSTRUCTION MACHINERY RESEARCH INSTITUTE LTD., Jiangsu (CN)

(72) Inventors: Hanguang Liu, Jiangsu (CN); Junshou Su, Jiangsu (CN); Leilei Gao, Jiangsu (CN)

(73) Assignee: JIANGSU XCMG CONSTRUCTION MACHINERY RESEARCH INSTITUTE LTD. (CN)

( * ) Notice: Subject to any disclaimer, the term of this patent is extended or adjusted under 35 U.S.C. 154(b) by 0 days.

(21) Appl. No.: 18/245,973

(22) PCT Filed: Jul. 28, 2021

(86) PCT No.: PCT/CN2021/108877

§ 371 (c)(1),
(2) Date: Mar. 20, 2023

(87) PCT Pub. No.: WO2022/068349

PCT Pub. Date: Apr. 7, 2022

(65) Prior Publication Data

US 2023/0383759 A1 Nov. 30, 2023

(30) Foreign Application Priority Data

Sep. 30, 2020 (CN) ......................... 202011058128.5

(51) Int. Cl.
*F04D 27/00* (2006.01)

(52) U.S. Cl.
CPC ........ *F04D 27/001* (2013.01); *F05D 2260/96* (2013.01); *F05D 2270/303* (2013.01); *F05D 2270/81* (2013.01)

(58) Field of Classification Search
CPC ...... F04D 27/001; F04D 29/522; F04D 29/66; F04D 29/63; F04D 29/667; F04D 29/668;
(Continued)

(56) References Cited

U.S. PATENT DOCUMENTS 4,116,269 A * 9/1978 Ikeda ....................... F01P 11/12
181/239
5,342,167 A * 8/1994 Rosseau ................ F04D 29/544
415/220

(Continued)

FOREIGN PATENT DOCUMENTS

CN 107842416 A * 3/2018 ................ F01P 5/02

*Primary Examiner* — J. Todd Newton
*Assistant Examiner* — Cameron A Corday

(57) ABSTRACT

A device, optimization method and system for cooperative matching of heat dissipation and noise are disclosed. A hood is mounted on a base, and a power device, a fan and a radiator are mounted in the hood; an output shaft of the power device is fixedly connected to a rotary shaft of the fan through a bearing pedestal to drive the fan to rotate, and the bearing pedestal is fixed on the base; the radiator is fixed on a radiator support, and a lead screw assembly is disposed on the base, and is used for changing the relative distance between the radiator and the fan; and a fan cover is mounted on a side, facing the fan, of the radiator, and a plurality of anemographs are disposed on the other side of the radiator, and a plurality of microphones are symmetrically disposed on two sides of the fan.

11 Claims, 6 Drawing Sheets

(58) Field of Classification Search
CPC ........ G01K 2210/109; G01K 2210/121; F01P 3/18; F01P 2070/50; F01P 2070/52
See application file for complete search history.

(56) References Cited

U.S. PATENT DOCUMENTS

| | | | | |
|---|---|---|---|---|
| 8,215,833 | B2 * | 7/2012 | Kouda | F01P 11/16<br>374/112 |
| 9,945,578 | B2 * | 4/2018 | Vanberg | F24F 11/30 |
| 10,514,205 | B2 * | 12/2019 | Hjorth | B01F 35/90 |
| 2011/0064559 | A1 * | 3/2011 | Gerard | F02C 7/045<br>415/119 |
| 2015/0047811 | A1 * | 2/2015 | Kappelman | B60K 11/04<br>165/96 |

* cited by examiner

DEVICE, OPTIMIZATION METHOD AND SYSTEM FOR COOPERATIVE MATCHING OF HEAT DISSIPATION AND NOISE

FIELD

The invention belongs to the technical field of heat management and noise control of engineering machines, and particularly relates to a device, optimization method and system for cooperative matching of heat dissipation and noise.

BACKGROUND

With the modernization in China, engineering machines become more complicated and larger in structure and higher in speed, which makes heat management and noise problems of the engineering machines more prominent. Difficult heat dissipation and loud noise of engineering machines during heavy-load work are the key factors restraining the quality improvement of engineering machines. The engineering machines are often fixed during work and transferred at a low speed, and are high in power. The heat loss by radiation of a diesel engine of the engineering machines accounts for about 700 of fuel heat, only about 30% of the fuel heat is used for effective power, and power consumed by a fan and accessories even reaches 20% of the effective power. In addition, the engineering machines have multiple heat sources, which generally include a hydraulic system, working devices, in addition to the engine. In order to make a cooling system work in an optimal condition, engineering vehicles should have a sufficient heat dissipation capacity and generate low noise, so it is necessary to optimize the overall arrangement, condition and relative positions of parts such as a fan, a radiator, a hood and a fan cover, to verify the suitability of model selection of these parts through optimal matching. How to solve the contradiction between heat dissipation and noise has become a difficult problem in the art.

At present, engineering vehicles are subjected to only one test, such as a fan air volume, pressure and noise test, a radiator heat dissipation and wind resistance test or a vehicle wind speed confirmation test, and there is no device, optimization method and control system for cooperative matching at home and abroad. Traditional designs based on empirical methods are complex in heat dissipation and noise estimation and only suitable for simple cooling systems, and cannot meet the design requirements of increasingly complicated modern engineering machines and automobiles. It is time-consuming and strenuous to verify the heat dissipation and noise performance of vehicles, and the influence of multi-factor variables is difficult to evaluate. Part matching is based on empirical installation parameter, an interval or a range is given, and specific installation parameters are determined within the interval or range by experience.

SUMMARY

To overcome the defects of the prior art, the objective of the invention is to provide a device and an optimization method and system for cooperative matching of heat dissipation and noise, which can completely replace a cooling system test of engineering vehicles, can quickly verify and test the heat dissipation and noise performance of the engineering vehicles, and can perform a multi-factor analysis test of the heat dissipation and noise performance.

The technical solution adopted by the invention to fulfill the above objective is as follows: a device for cooperative matching of heat dissipation and noise comprises a base, wherein a hood is mounted on the base, a power device, a fan and a radiator are mounted in the hood, the power device is fixed on an engine base, and the engine base is fixed on the base; an output shaft of the power device is fixedly connected to a rotary shaft of the fan through a bearing pedestal to drive the fan to rotate, and the bearing pedestal is fixed on the base; the radiator is fixed on a radiator support, and a lead screw assembly is disposed on the base, and is used for driving the radiator support to drive the radiator so as to change a relative distance between the radiator and the fan; and a fan cover is mounted on a side, facing the fan, of the radiator, and a plurality of anemographs are disposed on the other side of the radiator and are fixed on the base through anemograph holders; and a plurality of microphones are symmetrically disposed on two sides of the fan and are fixed on the base through microphone stands.

Further, an air inlet grille and an air outlet grille are disposed on the hood.

Further, the power device is a variable frequency motor, or a hydraulic motor powered by a hydraulic pump station.

Further, the lead screw assembly comprises a lead screw and a nut matched with the lead screw, the nut is fixed on the radiator support, the lead screw is fixed on the base through a lead screw bearing pedestal, and clamping portions for driving the lead screw are disposed at two ends of the lead screw.

Further, the axis of the fan and the axis of the bearing pedestal coincide and pass through the center of the radiator and the center of the fan cover.

Further, the height of the microphones is identical with the center height of the fan, and the center of the plurality of anemographs is collinear with the center of the fan cover.

An optimization method for cooperative matching of heat dissipation and noise uses the device for cooperative matching of heat dissipation and noise and comprises: a, setting structural parameters of the device for cooperative matching of heat dissipation and noise based on a test purpose; b, acquiring noise signals and wind speed signals in case of different V values and/or S values based on the structural parameters of the device for cooperative matching of heat dissipation and noise, wherein V is the speed of the fan, and S is the distance from the fan to the radiator; c, performing multi-factor orthogonal optimization analysis based on the structural parameters of the device for cooperative matching of heat dissipation and noise set in Step a, as well as the noise signals and wind speed signals acquired in Step b; and d, adjusting the structural parameters of the device for cooperative matching of heat dissipation and noise based on a result of the multi-factor orthogonal optimization analysis, and repeating Step b-Step d until an optimal result of cooperative matching of heat dissipation and noise is obtained.

Further, the structural parameters of the device for cooperative matching of heat dissipation and noise comprise: the type of the power device, the structure and form of a heat dissipation assembly, the diameter, air intake and blowing, and tip interval of the fan, the form of the hood, the structure and distances to the radiator of the air inlet grille and the air outlet grille, and the structure and position of the fan cover.

Further, the noise signal is noise power obtained according to the plurality of microphones, and the wind speed signal is an average value of wind speeds obtained according to the plurality of anemographs.

An optimization system for cooperative matching of heat dissipation and noise uses the device for cooperative matching of heat dissipation and noise, and comprises: a temperature sensor electrically connected to a controller and used for acquiring the temperature of a heat exchanger, a speed sensor electrically connected to the controller and used for acquiring the speed of the fan; and a speed control program installed in the controller, and used for setting a corresponding relation between the speed of the fan and the temperature of the heat exchanger and sending a control instruction to the power device according to the temperature of the heat exchanger to adjust the speed of the fan.

Compared with the prior art, the invention has the following beneficial effects:

(1) By simulating a cooling system of an engineering vehicle on a test stand, the invention can completely replace a cooling system test of the engineering vehicle, can quickly verify and test the heat dissipation and noise performance of the engineering vehicle, and can provide optimal installation parameters of the cooling system, thus improving the verifying efficiency of the heat dissipation and noise performance of the engineering vehicle and saving the equipment assembly time;

(2) The invention can perform an analysis and comparison in the heat dissipation and noise performance under the influence of multiple factors on a cooling system of a vehicle, and can also test, evaluate, optimize and improve the performance of the fan, the fan cover and the hood, to provide reference for high-volume and low-noise design of the vehicle.

DETAILED DESCRIPTION

Figure 1:
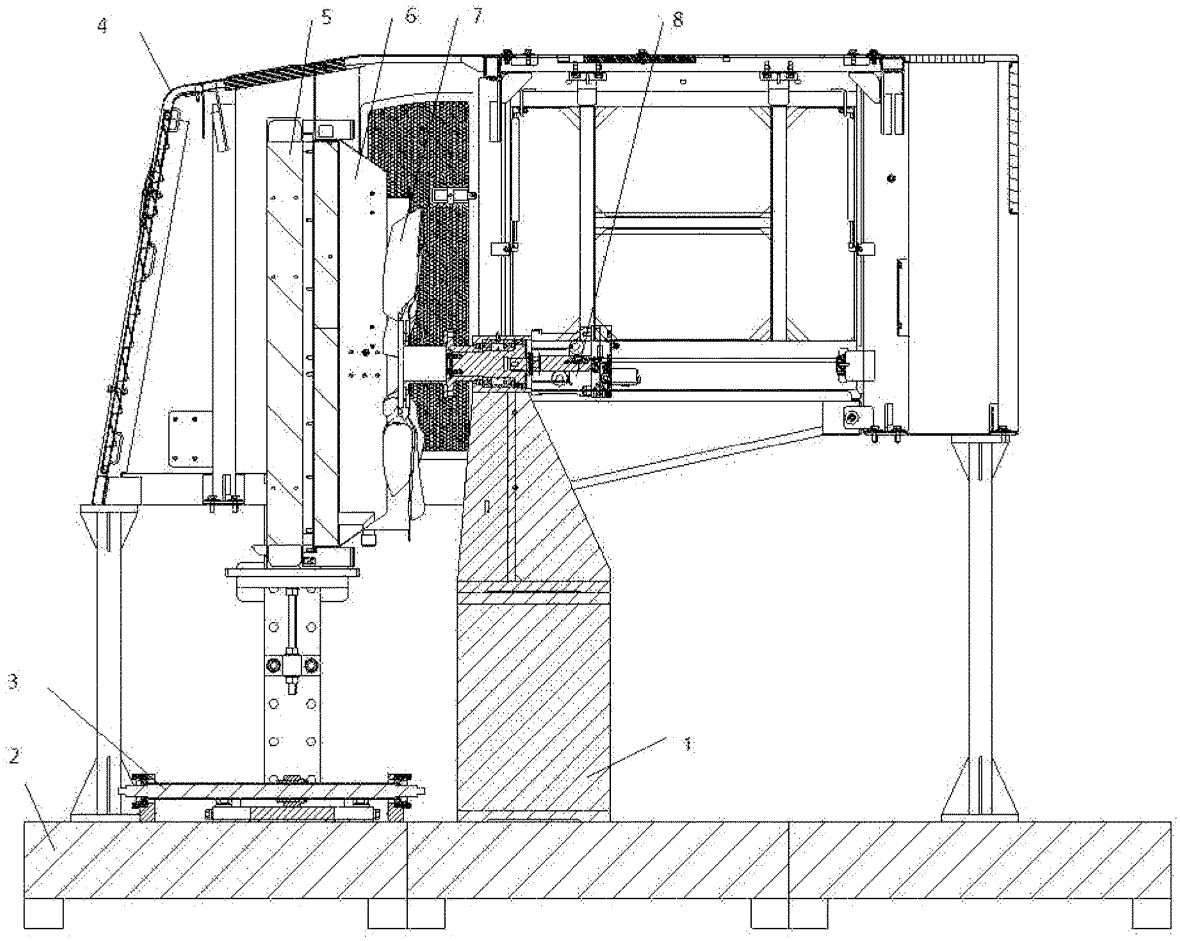
FIG. 1 is a sectional view of a device for cooperative matching of heat dissipation and noise according to one embodiment of the invention.

The invention will be further described below in conjunction with accompanying drawings. The following embodiments are merely used to explain the technical solutions of the invention more clearly, and should not be construed as limitations of the protection scope of the invention.

Embodiment 1

As shown in FIG. 1-FIG. 6, a device for cooperative matching of heat dissipation and noise comprises a base 2, wherein a hood 4 is mounted on the base 2, and an air inlet grille and an air outlet grille are disposed on the hood 4; a power device 8, a fan 7 and a radiator 5 are mounted in the hood 4, the power device 8 is fixed on an engine base 9, and the engine base 9 is fixed on the base 2; an output shaft of the power device 8 is fixedly connected to a rotary shaft of the fan 7 through a bearing pedestal 1 to drive the fan 7 to rotate, and the bearing pedestal 1 is fixed on the base 2; the radiator 5 is fixed on a radiator support; a lead screw assembly is disposed on the base 2, and is used for driving the radiator support to drive the radiator 5 so as to change a relative distance between the radiator 5 and the fan 7; and a fan cover 6 is mounted on a side, facing the fan 7, of the radiator 5, and the center of the power device 8, the center of the bearing pedestal 1, the center of the fan 7 and the center of the fan cover 6 coincide. 16 anemographs are disposed on the other side of the radiator 5 and are fixed on the base 2 through anemograph holders; and four microphones M1-M4 are symmetrically disposed on two sides of the fan 7 and are fixed on the base 2 through microphone stands.

Figure 2:
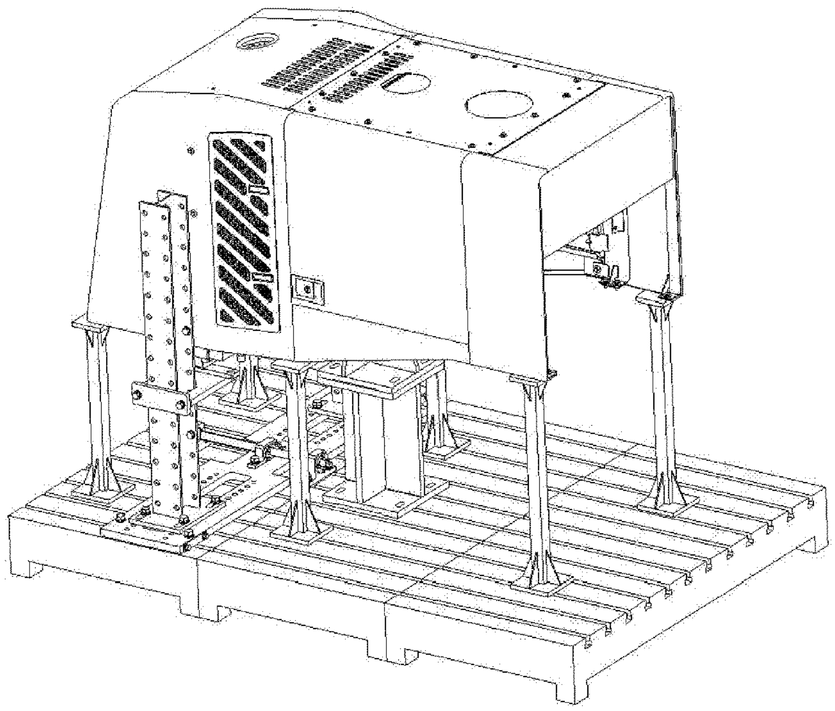
FIG. 2 is an assembly diagram of the device for cooperative matching of heat dissipation and noise according to one embodiment of the invention.
Figure 3:
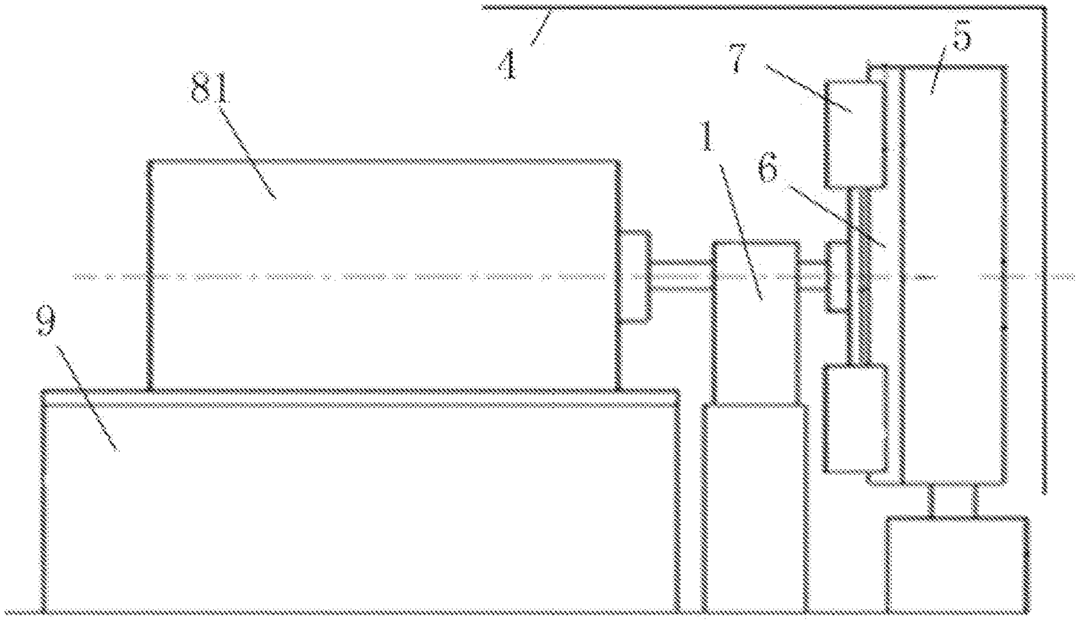
FIG. 3 is a principle diagram of the device for cooperative matching of heat dissipation and noise, applied to an engineering vehicle with a direct-coupled engine and an electromagnetic/silicone oil clutch.
Figure 4:
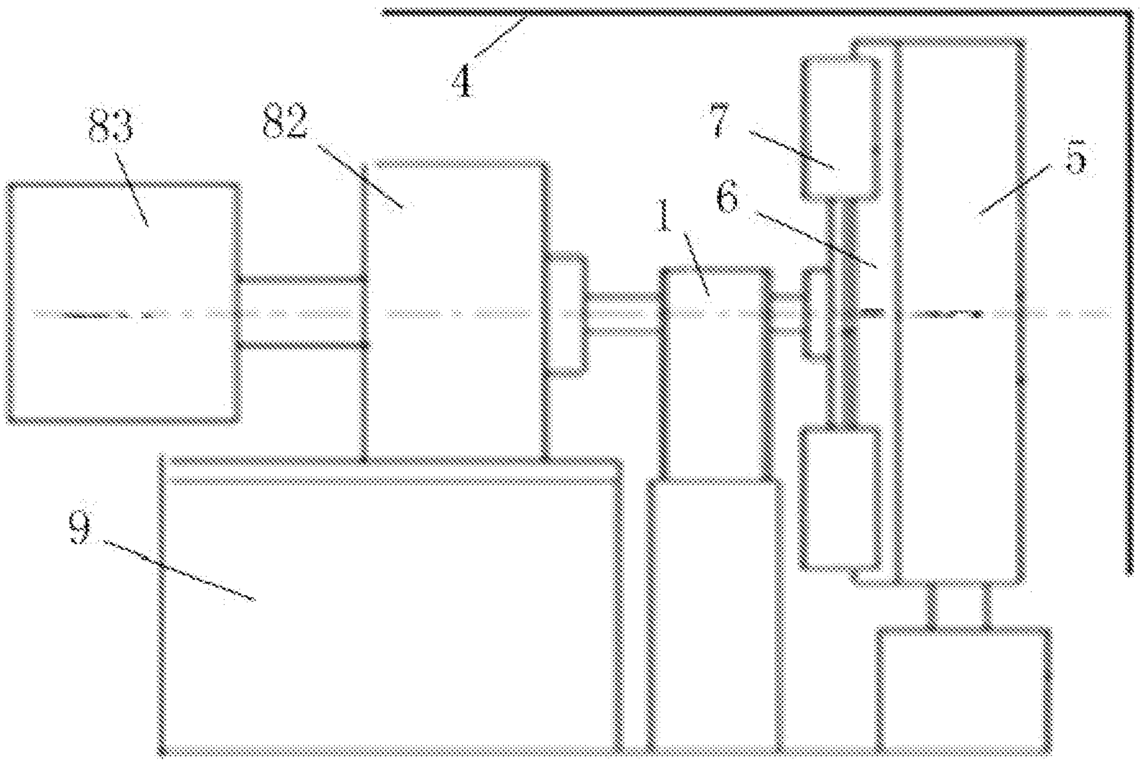
FIG. 4 is a principle diagram of the device for cooperative matching of heat dissipation and noise, applied to an engineering vehicle capable of realizing independent heat dissipation based on hydraulic drive.
Figure 5:
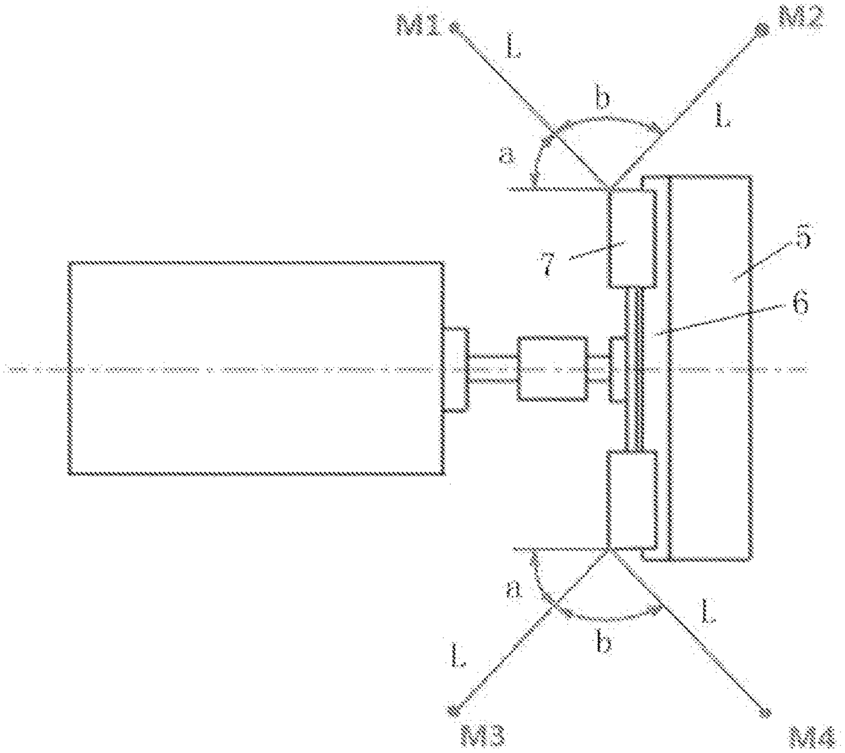
FIG. 5 is a top view of the installation positions of microphones during a noise test.
Figure 6:
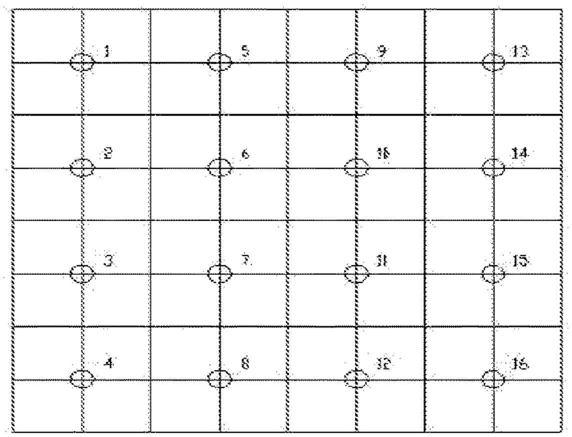
FIG. 6 is a schematic diagram of the arrangement of anemographs during an air volume test.

The lead screw assembly comprises a lead screw 3 and a nut matched with the lead screw 3, wherein the nut is fixed on the radiator support, the lead screw 3 is fixed on the base 2 through a lead screw bearing pedestal, clamping portions for driving the lead screw 3 are disposed at two ends of the lead screw 3, and the clamping portions can be clamped with a tool to rotate the lead screw as needed, so as to change the distance between the radiator 5 and the fan 7. The axis of the fan 7 and the axis of the bearing pedestal 1 coincide and pass through the center of the radiator 5 and the center of the fan cover 6. The fan cover 6 is composed of four wind shields. Each wind shield is trapezoidal to form a rectangular frame with a big end fixed on the radiator 5 and a small end facing the fan 7. The hood 4 is mounted on the base 2 and simulates the condition of a vehicle (as shown in FIG. 1 and FIG. 2, the bottom of the hood 4 is not sealed in this embodiment; whether the bottom of the hood 4 is sealed is determined according to the condition of the vehicle; when the hood 4 is applied to an engineering machine with the bottom being sealed, the hood 4 can be assembled in a sealed manner according to the specific structure of the machine). When applied to an engineering machine provided with a direct coupled engine and an electromagnetic/silicone oil clutch, the power device 8 is a variable frequency motor 81. When applied to an engineering vehicle capable of realizing independent heat dissipation based on hydraulic drive, the variable frequency motor is replaced with a hydraulic motor 82 powered by a hydraulic power station 83. The microphones are connected to a data acquisition unit and are used for acquiring noise signals, and the installation positions of the four microphones M1-M4 are shown in FIG. 5 (top view), and in this embodiment, L=1 m, a=45°, b=90° (the microphones are located outside the hood 4); the height of the four microphones M1-M4 is identical with the center height of the fan 7, and noise power is figured out through four points; the back side of the radiator 5 (the side backing onto the cooling fan) is divided by the anemograph holders into 16 parts shown in FIG. 6, the wind speed of the center point of each part is measured through one anemograph, the output speed of the power device 8 can be adjusted to drive the fan 7 to rotate at a certain speed, the wind speeds of the center points of the 16 parts of the radiator 5 are acquired, an average value of the wind speeds is calculated, and the center of the 16 anemographs is collinear with the center of the fan cover 6.

In this embodiment, by simulating a cooling system of an engineering vehicle on a test stand, the device can completely replace a cooling system test of the engineering vehicle, can quickly verify and test the heat dissipation and noise performance of the engineering vehicle, and can provide optimal installation parameters of the cooling system, thus improving the verifying efficiency of the heat dissipation and noise performance of the engineering vehicle and saving the equipment assembly time.

Embodiment 2

Based on the device for cooperative matching of heat dissipation and noise in Embodiment 1, this embodiment provides an optimization method for cooperative matching of heat dissipation and noise, comprising: a, setting structural parameters of the device for cooperative matching of heat dissipation and noise based on a test purpose; b, acquiring noise signals and wind speed signals in case of different V values and/or S values based on the structural parameters of the device for cooperative matching of heat dissipation and noise, wherein V is the speed of the fan, and S is the distance between the fan and the radiator; c, performing multi-factor orthogonal optimization analysis based on the structural parameters of the device for cooperative matching of heat dissipation and noise set in Step a, as well as the noise signals and wind speed signals acquired in Step b; and d, adjusting the structural parameters of the device for cooperative matching of heat dissipation and noise based on a result of the multi-factor orthogonal optimization analysis, and repeating Step b-Step d until an optimal result of cooperative matching of heat dissipation and noise is obtained.

Step 1: structural parameters of the device for cooperative matching of heat dissipation and noise are set based on a test purpose; heat dissipation and noise are produced under the influence of multiple structures, and based on the test purpose, the structural parameters of the device for cooperative matching of heat dissipation and noise can be selected, as follows:

(1) The speed, diameter, air intake and blowing, and tip interval of the fan, the distance between the fan and a core of the radiator, and the distance between the fan and the fan cover, (2) The type of the power device, the form of the engine room hood, the structure (size, hole site, porosity, position and shape) of the air inlet grille and the air outlet grille, and the distances to the radiator of the air inlet grille and the air outlet grille;

(3) The structure, installation form and size of a heat dissipation assembly, the structure and shape of the fan cover, and the position of the wind shields.

Figure 7:
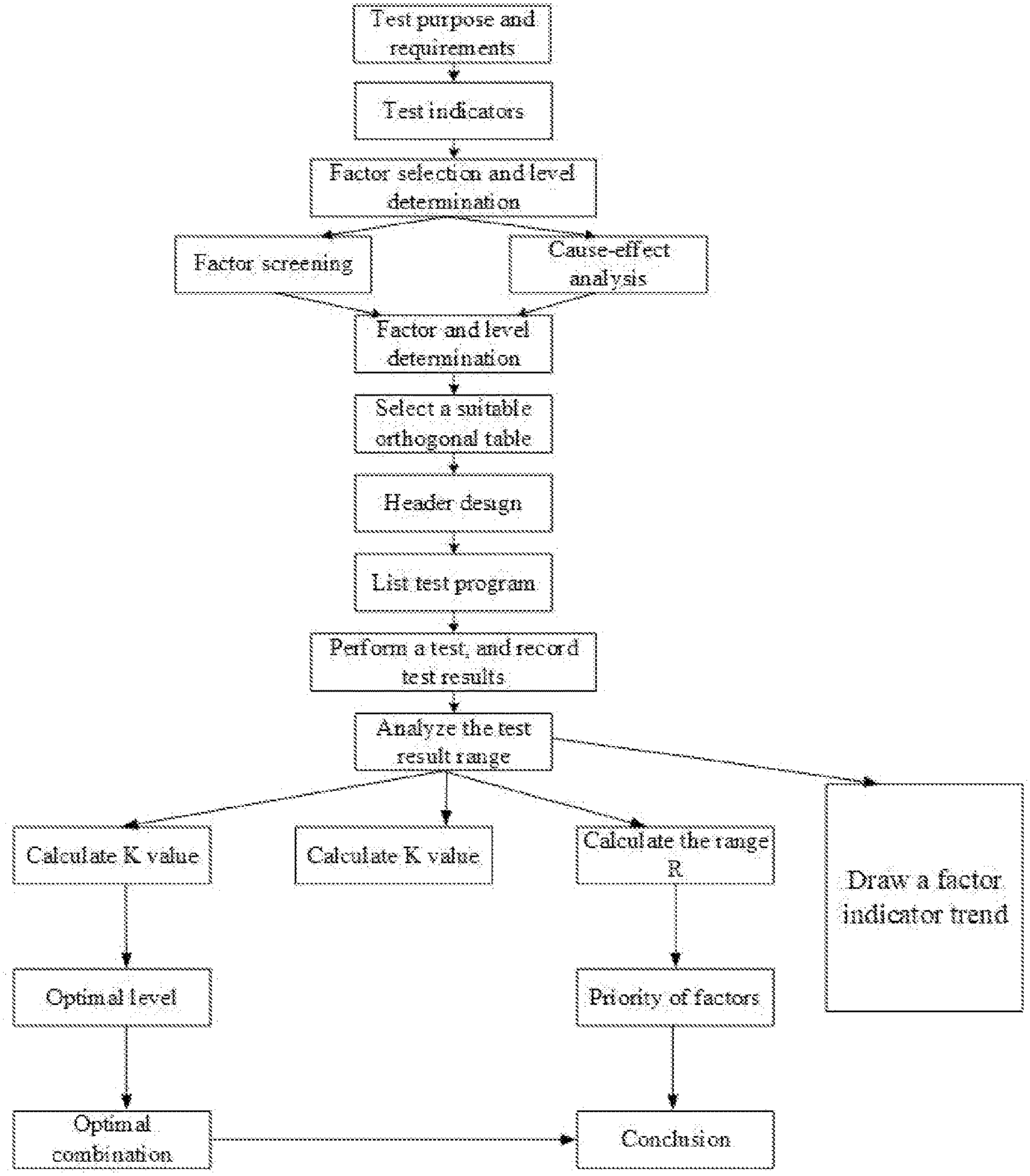
FIG. 7 illustrates a basic process designed for an orthogonal test.

Step 2: noise signals and wind speed signals in case of different V values and/or S values are acquired based on the structural parameters of the device for cooperative matching of heat dissipation and noise, wherein V is the speed of the fan, and S is the distance between the fan and the radiator;

Step 3: multi-factor orthogonal optimization analysis is performed based on the structural parameters of the device for cooperative matching of heat dissipation and noise set in Step 1, as well as the noise signals and wind speed signals acquired in Step 2;

Researchers not only want to know how heat dissipation and noise change when one structural parameter changes, but also want to gain a comprehensive understanding of the combined effect of these structural parameters, to obtain the optimal heat dissipation and noise performance. In this embodiment, when an orthogonal optimization method is used to optimize the structural parameters, the basic process of an orthogonal test is shown in FIG. 7, ranges of orthogonal test results of heat dissipation and noise under the influence of various factor combinations are analyzed, and an optimal factor level combination is determined based on comprehensive consideration of the priority of the influence of factors;

Step 4: the structural parameters of the device for cooperative matching of heat dissipation and noise are adjusted based on a result of the multi-factor orthogonal optimization analysis, and Step 1-Step 4 are repeated until an optimal result of cooperative matching of heat dissipation and noise is obtained.

The overall arrangement, condition and relative positions of parts of the system in this embodiment are almost the same as those of a vehicle, so the system can replace a cooling system test of the vehicle, can perform an analysis and comparison in the heat dissipation and noise performance under the influence of multiple factors on a cooling system of the vehicle, and can also test, evaluate, optimize and improve the performance of the fan, the fan cover and the hood, to provide reference for high-volume and low-noise design of the vehicle.

Embodiment 3

Based on the device for cooperative matching of heat dissipation and noise in Embodiment 1 and the optimization method for cooperative matching of heat dissipation and noise in Embodiment 2, this embodiment provides an optimization system for cooperative matching of heat dissipation and noise, comprising: a temperature sensor electrically connected to a controller and used for acquiring the temperature of a heat exchanger, a speed sensor electrically connected to the controller and used for acquiring the speed of the fan; and a speed control program installed in the controller, and used for setting a corresponding relation between the speed of the fan and the temperature of the heat exchanger and sending a control instruction to the power device according to the temperature of the heat exchanger to adjust the speed of the fan.

Figure 8:
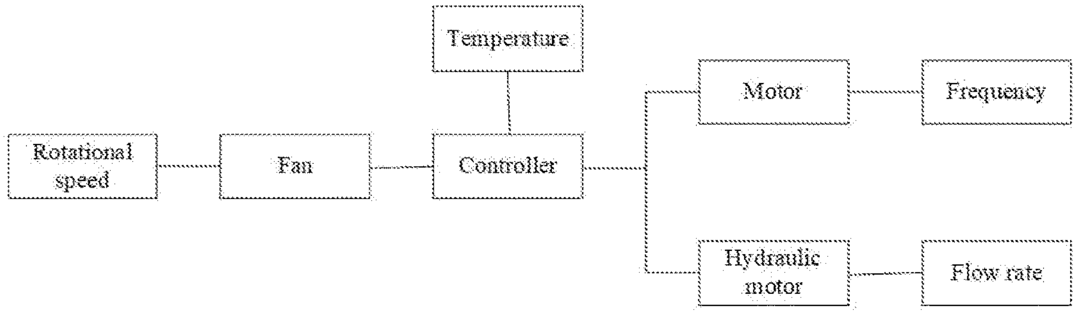
FIG. 8 is a structural diagram of an optimization system for cooperative matching of heat dissipation and noise according to one embodiment of the invention.
Figure 9:
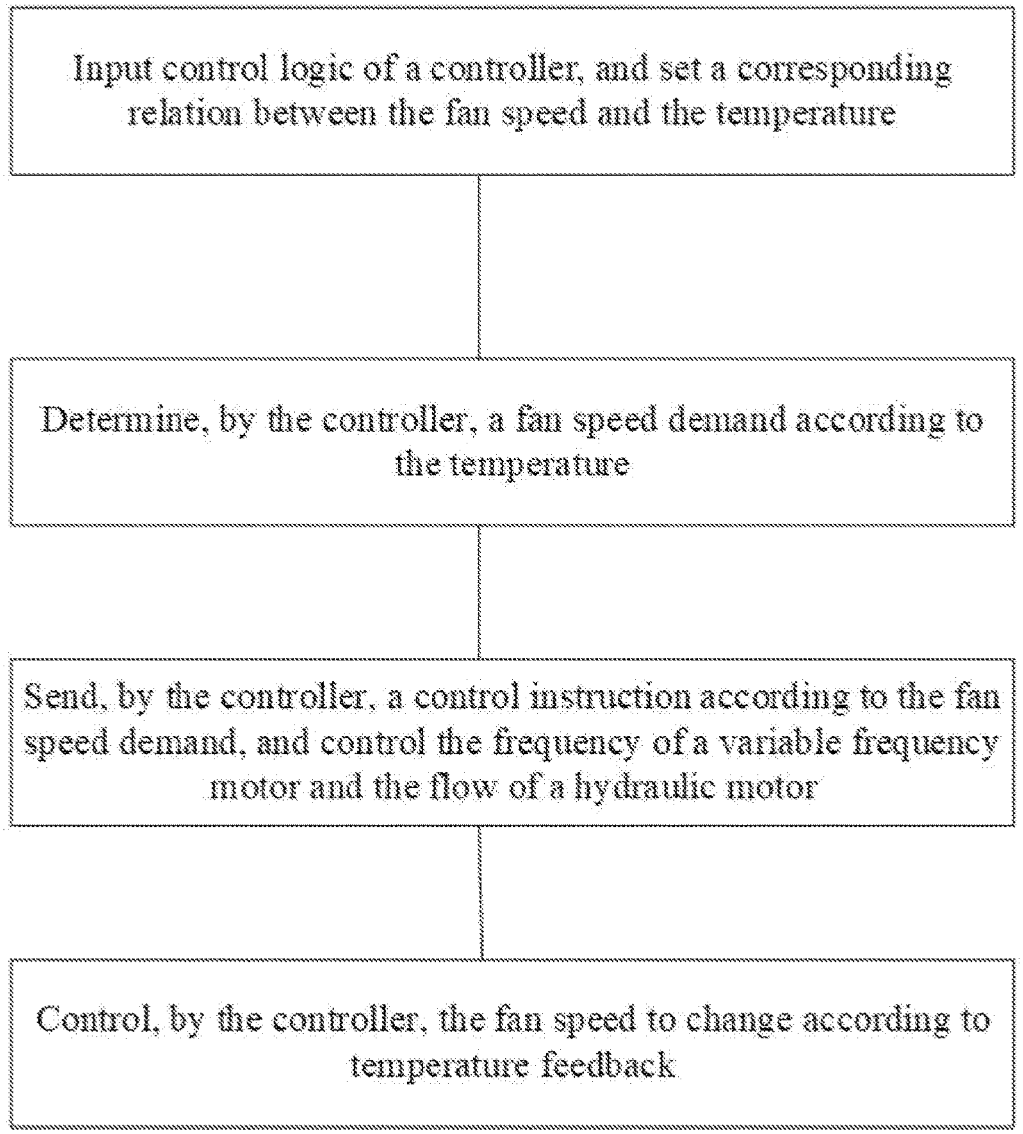
FIG. 9 is a logic diagram of cooperative control of heat dissipation and noise according to the invention.

As shown in FIG. 8 and FIG. 9, an execution system is mainly composed of a variable frequency motor and a hydraulic motor, a control part is composed of the controller, the speed control program is installed in the controller, the temperature has a corresponding relation with the speed, the speed of the fan can be controlled by controlling the frequency of the motor and the flow of the hydraulic motor, data of the temperature sensor is input to the controller through a series port, the controller analyzes temperature data and determines the speed of the fan, the speed sensor is disposed in the device, the variable frequency motor and the hydraulic motor receive a control signal from the controller, and the frequency and the flow are adjusted according to the control instruction from the controller to simulate the actual condition of a vehicle.

The above embodiments are merely preferred ones of the invention. It should be noted that some improvements and transformations can be made by those ordinarily skilled in the art without departing from the technical principle of the invention, and all these improvements and transformations should fall within the protection scope of the invention.

What is claimed is:

1. A device for cooperative matching of heat dissipation and noise, comprising a base, wherein,
   a hood is mounted on the base,
   a power device, a fan and a radiator are mounted in the hood,
   the power device is fixed on an engine base, and the engine base is fixed on the base;
   an output shaft of the power device is fixedly connected to a rotary shaft of the fan through a bearing pedestal to drive the fan to rotate, and the bearing pedestal is fixed on the base;
   the radiator is fixed on a radiator support, and a lead screw assembly is disposed on the base, and is used for driving the radiator support to drive the radiator so as to change a relative distance between the radiator and the fan; and a fan cover is mounted on a side, facing the fan, of the radiator, and a plurality of anemographs are disposed on the other side of the radiator and are fixed on the base through anemograph holders; and
   a plurality of microphones are symmetrically disposed on two sides of the fan and are fixed on the base through microphone stands.

2. The device for cooperative matching of heat dissipation and noise according to claim 1, wherein an air inlet grille and an air outlet grille are disposed on the hood.

3. The device for cooperative matching of heat dissipation and noise according to claim 1, wherein the power device is a variable frequency motor, or a hydraulic motor powered by a hydraulic pump station.

4. The device for cooperative matching of heat dissipation and noise according to claim 1, wherein the lead screw assembly comprises a lead screw and a nut matched with the lead screw, the nut is fixed on the radiator support, the lead screw is fixed on the base through a lead screw bearing pedestal, and clamping portions for driving the lead screw are disposed at two ends of the lead screw.

5. The device for cooperative matching of heat dissipation and noise according to claim 1, wherein an axis of the fan and an axis of the bearing pedestal coincide and pass through a center of the radiator and a center of the fan cover.

6. The device for cooperative matching of heat dissipation and noise according to claim 5, wherein a height of the microphones is identical with a center height of the fan, and a center of the plurality of anemographs is collinear with the center of the fan cover.

7. An optimization method for cooperative matching of heat dissipation and noise, using the device for cooperative matching of heat dissipation and noise according to claim 1, and comprising the following steps
   a, setting structural parameters of the device for cooperative matching of heat dissipation and noise based on a test purpose;
   b, acquiring noise signals and wind speed signals in case of different V values and/or S values based on the structural parameters of the device for cooperative matching of heat dissipation and noise, wherein V is the speed of the fan, and S is the distance from the fan to the radiator;
   c, performing multi-factor orthogonal optimization analysis based on the structural parameters of the device for cooperative matching of heat dissipation and noise set in Step a, as well as the noise signals and wind speed signals acquired in Step b; and
   d, adjusting the structural parameters of the device for cooperative matching of heat dissipation and noise based on a result of the multi-factor orthogonal optimization analysis, and repeating Step b-Step d until an optimal result of cooperative matching of heat dissipation and noise is obtained.

8. The optimization method for cooperative matching of heat dissipation and noise according to claim 7, wherein the structural parameters of the device for cooperative matching of heat dissipation and noise comprise: a type of the power device, a structure and form of a heat dissipation assembly, a diameter, air intake and blowing, and tip interval of the fan, a form of the hood, structures and distances to the radiator of the air inlet grille and the air outlet grille, and a structure and position of the fan cover.

9. The optimization method for cooperative matching of heat dissipation and noise according to claim 7, wherein the noise signal is noise power obtained according to the plurality of microphones, and the wind speed signal is an average value of wind speeds obtained according to the plurality of anemographs.

10. An optimization system for cooperative matching of heat dissipation and noise, using the device for cooperative matching of heat dissipation and noise according to claim 1, comprising
   a temperature sensor electrically connected to a controller and used for acquiring the temperature of a heat exchanger;
   a speed sensor electrically connected to the controller and used for acquiring the speed of the fan; and
   a speed control program installed in the controller, and used for setting a corresponding relation between the speed of the fan and the temperature of the heat exchanger and sending a control instruction to the power device according to the temperature of the heat exchanger to adjust the speed of the fan.

11. The device for cooperative matching of heat dissipation and noise according to claim 1, wherein
   16 anemographs are disposed on the other side of the radiator and are fixed on the base through anemograph holders; the back side of the radiator is divided by the anemograph holders into 16 parts, a wind speed of a center point of each part is measured through a respective anemograph, and a center of the 16 anemographs is collinear with a center of the fan cover; and
   four microphones are symmetrically disposed on the two sides of the fan and are fixed on the base through microphone stands; wherein, first microphone and second microphone are disposed on one side of the fan, and a distance between the first microphone and an end of the fan is 1 m, and a distance between the first microphone and the end of the fan is 1 m, an angle formed by the first microphone and a side of the fan facing the first microphone is 45°, and the first microphone and the second microphone form an angle of 90° with the end of the fan; heights of the four microphones are identical with a center height of the fan.

* * * * *